United States Patent
Mehandale et al.

(10) Patent No.: US 11,528,291 B2
(45) Date of Patent: Dec. 13, 2022

(54) METHODS AND APPARATUS FOR DEFENDING AGAINST EXPLOITATION OF VULNERABLE SOFTWARE

(71) Applicant: McAfee, LLC, Santa Clara, CA (US)

(72) Inventors: Jyothi Mehandale, Bangalore (IN); Craig Schmugar, Beaverton, OR (US)

(73) Assignee: McAfee, LLC, Santa Clara, CA (US)

( * ) Notice: Subject to any disclaimer, the term of this patent is extended or adjusted under 35 U.S.C. 154(b) by 365 days.

(21) Appl. No.: 16/694,714

(22) Filed: Nov. 25, 2019

(65) Prior Publication Data
US 2021/0160272 A1    May 27, 2021

(51) Int. Cl.
*H04L 9/40*   (2022.01)
*H04L 41/16*  (2022.01)
*G06F 16/903* (2019.01)

(52) U.S. Cl.
CPC .......... *H04L 63/1433* (2013.01); *H04L 41/16* (2013.01); *H04L 63/1416* (2013.01); *H04L 63/1441* (2013.01); *H04L 63/20* (2013.01); *G06F 16/903* (2019.01)

(58) Field of Classification Search
CPC . H04L 63/1433; H04L 41/16; H04L 63/1416; H04L 63/1441; H04L 63/20
See application file for complete search history.

(56) References Cited

U.S. PATENT DOCUMENTS

| | | | | |
|---|---|---|---|---|
| 2009/0144827 | A1* | 6/2009  | Peinado    | H04L 63/1433 726/25 |
| 2011/0321164 | A1* | 12/2011 | Saxena     | G06F 21/577 726/25 |
| 2013/0019314 | A1* | 1/2013  | Ji         | H04L 63/168 726/25 |
| 2017/0339172 | A1* | 11/2017 | Mahadevia  | H04L 63/1416 |
| 2018/0107821 | A1* | 4/2018  | Eshkenazi  | G06F 9/328 |

* cited by examiner

*Primary Examiner* — Oleg Korsak
(74) *Attorney, Agent, or Firm* — Hanley, Flight & Zimmerman, LLC

(57) ABSTRACT

Methods, apparatus, systems and articles of manufacture are disclosed for defending against exploitation of vulnerable software. An example apparatus comprises an inventory controller to identify a vulnerable application corresponding to one or more files including a security defect, an origination identifying generator to identify an origination source of incoming data, the origination source tagged as suspicious, a workload analyzing controller to query, in response to the suspicious origination source, an inventory datastore to determine if the incoming data is to be accessed by the vulnerable application, and a policy application executor to, in response to determining the incoming data is to be accessed by the vulnerable application, apply a policy action to the vulnerable application to protect the vulnerable application from exposing the security defect to malicious data in the incoming data.

20 Claims, 6 Drawing Sheets

METHODS AND APPARATUS FOR DEFENDING AGAINST EXPLOITATION OF VULNERABLE SOFTWARE

FIELD OF THE DISCLOSURE

This disclosure relates generally to exploitation of vulnerable software, and, more particularly, to defending against exploitation of vulnerable software.

BACKGROUND

Phishing attacks are malicious user interfaces and/or messages (emails, websites, applications) that are disseminated by attackers to attempt to steal a user's private information. Phishing attacks impersonate trusted entities (e.g., a banking website) to convince users to submit private data, install malware, and/or gain access to sensitive networks. Phishing attacks cause serious harm and privacy breaches to many Internet users.

Figure 1:
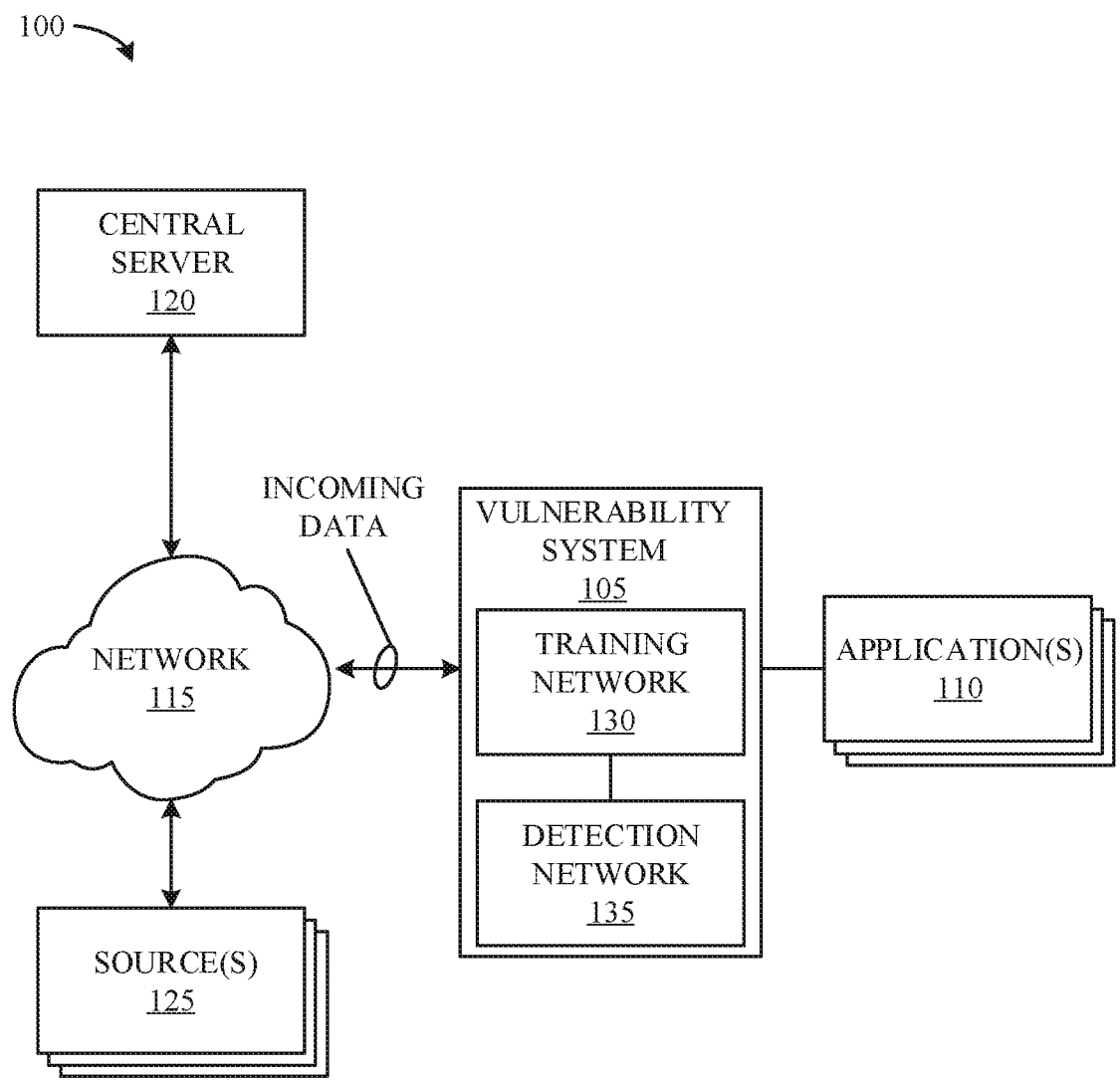
FIG. 1 is an illustration of an example computing environment to implement an example vulnerability system to enforce policy actions on vulnerable applications.

The figures are not to scale. In general, the same reference numbers will be used throughout the drawings and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Typically, phishing attacks are only successful when a user performs an action. Actions may include clicking a link, opening a document, calling a phone number, etc. For example, a social engineer sends an email to the user, impersonating an online retailer with which the user has an account. The email may contain a body indicating that the user's credit card information must be updated immediately at an attached link, or else the user's account will be suspended. The phishing attack will not cause harm to the user's device unless the user performs the indicated action, which is clicking on the attached link and updating the credit card information. Therefore, when the user performs the action, the social engineer may exploit the user's credit card information and additionally may exploit any vulnerable applications of the device.

Conventional methods to protect a computing device from exploitation of vulnerable applications include sending patches, removing all user access to one or more applications flagged as vulnerable in the computing device, and sending notifications to users of the computing device. In examples disclosed herein, a vulnerable application is a system flaw or weakness in the application that can be exploited to compromise the security of the application. In examples disclosed herein, a patch is a set of changes designed to update, fix, or improve an application flagged as vulnerable. Patches may be installed onto a computing device under programmed control (e.g., the application designer sends patches through the network 115) or by the user of the computing device.

In some examples, conventional methods may be ineffective. For example, sending patches to a computing device can take an unwanted length of time due to the underlying knowledge an administrator needs to have to design the patch for the application. During the length of time between designing the patch and sending the patch, the computing device may be exposed to phishing attacks without having protection.

In other examples, conventional methods may be ineffective when the methods remove all user access to one or more applications flagged as vulnerable. For example, it may be unnecessary to remove all user access to the application when some features, components, functions, etc. of the application do not include vulnerabilities and should be accessible by the user without the risk of exploitation.

Example systems, methods, and apparatus disclosed herein defend vulnerable applications from exploitation to harmful and/or malicious data. For example, examples disclosed herein determine vulnerable applications operating on a computing device. Examples disclosed herein assess the vulnerable applications to determine one or more files that include vulnerabilities (e.g., vulnerable data). Further, examples disclosed herein apply policy actions to the one or more files determined to include the vulnerabilities when a potential threat is detected. Policy actions may include predetermined instructions, stored in a policy datastore, that may be applied to the one or more files determined to include vulnerabilities. In this manner, examples disclosed herein may merely limit access to the vulnerable files of the vulnerable application and not limit access to the all of the files of the vulnerable application. Therefore, examples disclosed herein increase and/or improve user productivity of the computing device including vulnerable applications relative to conventional methods that may restrict user productivity due to denying user access to all files of the vulnerable application.

FIG. 1 illustrates a block diagram of an example computing environment 100 to implement an example vulnerability system 105 in accordance with the teachings of this disclosure to enforce policy actions on vulnerable applications. The example computing environment 100 includes the example vulnerability system 105, example applications 110, an example network 115, an example central server 120, and example sources 125.

In FIG. 1, the example computing environment 100 includes the example vulnerability system 105 to determine vulnerable ones of the example applications 110 and enforce a policy action on the vulnerable ones of the example applications 110. In some examples, the vulnerability system 105 may be implemented on a user device, such as a web browser extension or an anti-virus package. The example vulnerability system 105 is in communication with the example central server 120 and the example sources 125 via the example network 115. In some examples, the vulnerability system 105 may be deployed on a user device by the example central server 120. In some examples, the vulnerability system 105 receives incoming data from the central server 120 and/or the sources 125 via the network 115. As used herein, incoming data includes, but is not limited to, executable files (e.g., executables), application data, and any other suitable information to be accessed and/or analyzed, such as data stored as XML (Extensible Markup Language), JSON (JavaScript Object Notation), etc. In some examples, the vulnerability system 105 communicates with the example applications 110 to collect inventory of the computing environment 100. In some examples, the vulnerability system 105 communicates with the applications 110 to determine vulnerable ones of the applications 110.

The example vulnerability system 105 includes an example training network 130 and an example detection network 135 to determine vulnerable ones of the example applications 110 and enforce a policy action on the vulnerable ones of the example applications 110. For example, the training network 130 determines the vulnerable ones of the applications 110 and the detection network 135 determines which policy action to apply to the vulnerable applications. The example training network 130, the example detection network 135, and/or more generally, the example vulnerability system 105 is described in further detail below in connection with FIGS. 2 and 3.

In FIG. 1, the example computing environment 100 includes the example applications 110 to provide application services to the users of the example computing environment 100. In some examples, the applications 110 may be bundled with the computing environment 100 or published separately from the computing environment 100. For example, the applications 110 may be pre-installed on a user device by the example central server 120 or the applications 110 may be accessed via the network 115 from the example sources 125. In some examples, the application 110 is application software designed to perform a group of coordinated functions, tasks, or activities for the benefit of the user. For example, an application 110 may be a word processor, a spreadsheet editor, an accounting tool, a web browser, an email client, a media player, a file viewer, an aeronautical flight simulator, a console game, a photo editor, etc. In some examples, the applications 110 of the computing environment 100 may include all the above-mentioned examples.

In some examples, ones of the applications 110 may be vulnerable. For example, an application 110 operating at an old version may be considered vulnerable. An old version of an application (e.g., ones of the applications 110) refers to an original, previous, and/or outdated version of the application that does not include new updates, changes, and/or revisions. Such updates, changes, and/or revisions for new versions of ones of the applications 110 may be designed to protect one or more files in the application from malicious data. In some examples, the updates, changes, and/or revisions may be patched to an application of the ones of applications 110.

In FIG. 1, the example computing environment 100 includes the example network 115 to allow communication between the example central server 120, the example vulnerability system 105, the example applications 110, and/or the example sources 125. The example network 115 may be implemented by any type(s) and/or number of networks, such as one or more wireless networks (e.g., mobile cellular networks, wireless local area networks, satellite network, etc.), one or more wired networks (e.g., cable networks, dedicated transmission lines, etc.), the Internet, etc.

In FIG. 1, the example computing environment 100 includes the example central server 120 to communicate via the network 115 with the example vulnerability system 105, the example applications 110, etc. The example central server 120 communicates information, such as policy information and context information, to the example vulnerability system 105 to enable the determining of vulnerable ones of the example applications 110 and enforce a policy action on the vulnerable ones of the example applications 110. In some examples, the central server 120 provides instructions (e.g., executable instructions) to the vulnerability system 105 to enable the collection of inventory data of the computing environment 100. In some examples, the instructions provided to the vulnerability system 105 are executable instructions that may be directly executed by the vulnerability system 105. However, in some examples, the instructions are provided as part of a software development kit (SDK), application programming interface (API) to an intermediary party (e.g., a manufacturer, an app developer) to enable the intermediary party to create (e.g., design, develop, compile, etc.) executable instructions (e.g., an application, firmware, etc.) to be executed at the vulnerability system 105.

In FIG. 1, the example computing environment 100 includes the example sources 125 which are external and/or internal sources that provide data to the example applications 110. For example, the sources 125 may include external servers, internal servers, external computing devices, websites, external networks, internal networks, trusted and/or non-trusted removeable media devices, etc. In some examples, the sources 125 are operated by social engineers, who disseminate one or more malicious messages, via the sources 125, to be accessed by the ones of applications 110. The example sources 125 may communicate phishing attacks, malicious messages, etc., to the example applications 110 via the network 115, which may be intercepted and analyzed by the example vulnerability system 105. For example, the vulnerability system 105 monitors the origination source of incoming data before an application (e.g., ones of the applications 110) can access the incoming data.

Figure 2:
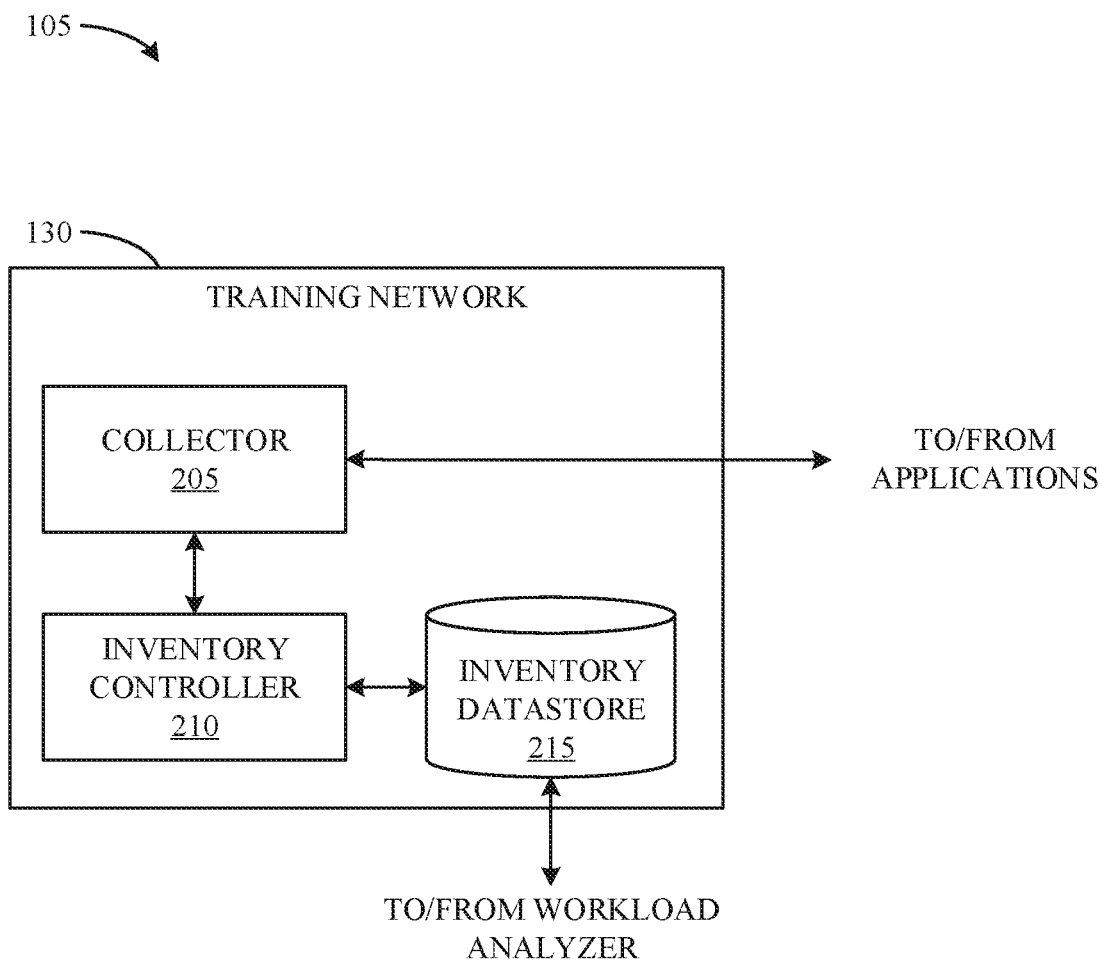
FIG. 2 is a block diagram illustration of an example training network implemented by the example vulnerability system of FIG. 1 to determine the vulnerable applications.

FIG. 2 illustrates an example training network 130 implemented by the example vulnerability system 105. The example training network 130 prepares the example vulnerability system 105 to apply policy actions by determining vulnerable ones of the applications 110. The example training network 130 includes the example collector 205, the example inventory controller 210, and the example inventory datastore 215.

In FIG. 2, the example collector 205 is an internal collector node. A collector node may query directories, registries, libraries, and other datastores of the computing environment 100 for inventory. The inventory corresponds to a list of programs installed and operating in the computing device. For example, the collector 205 generates a list of all the applications 110 (e.g., word processors, gaming files, simulators, etc.), programs, etc. installed on the computing device of the computing environment 100 or deployed in the network 115 and utilized by the computing environment 100.

In some examples, the collector 205 collects inventory information. Inventory information includes configuration settings, application information, file information, and additional information of the computing device. In examples disclosed herein, a directory is a location for storing files on a computing device. For example, a directory may be used to store, organize, and separate files and subdirectories on the computing device. In some examples, a first directory may store pictures and a second directory may store text documents. Additionally, directories may be used to store programs (e.g., applications). For example, when a program is installed, the program files are stored in a unique directory that may contain subdirectories and tens, hundreds, or thousands of files related to that program. By storing a program in a unique directory, files with the same name are prevented from becoming overwritten, modified, or deleted by other programs.

In examples disclosed herein, a registry or library is a hierarchical database that stores low-level settings for applications (e.g., ones of applications 110). For example, when a new application is installed, the configuration settings are stored as keys and values in the registry. During usage of the application, modifications may be made, and the configuration settings may be updated in the registry. Additionally, a registry may be an index to the operation of a kernel (e.g., the core operating system of the computing device), wherein the registry includes run-time information of the computing device.

The example collector 205 gathers inventory information from the directories, libraries, registries, etc. to propagate to the example inventory controller 210. In some examples, the collector 205 gathers inventory information of the computing device upon installation of the vulnerability system 105. For example, when the vulnerability system 105 is installed and/or deployed, the collector 205 begins gathering application information about the computing device in which the vulnerability system 105 is deployed. Alternatively, the example collector 205 periodically queries the directories, registries, libraries, etc., of the computing device to gather information that has been updated, modified, etc., since installation of the example vulnerability system 105. For example, the collector 205 may query the directories, registries, libraries, etc., once every other hour, once a day, once a week, when the computing device is powered on, etc. In some examples, the collector 205 may receive instructions from the example central server 120 to collect inventory information.

In FIG. 2, the example training network 130 includes the example inventory controller 210 to identify ones of the example applications 110 that are vulnerable. The example inventory controller 210 may be implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example inventory controller 210 receives inventory data from the example collector 205 and performs a vulnerability assessment. In examples disclosed herein, a vulnerability assessment provides an organization or an individual user with information on security weaknesses in the computing environment 100 and/or in the computing device. For example, a vulnerability assessment is the process of defining, identifying, classifying, and prioritizing vulnerabilities in computing environments (e.g., the computing environment 100 of FIG. 1), applications (e.g., applications 110), and network infrastructures (e.g., the network 115). The example inventory controller 210 identifies a vulnerable application, wherein the vulnerable application includes one or more files including a security defect. A security defect is a software bug that can be exploited to gain unauthorized access or privileges on a computing device.

In some examples, the inventory controller 210 controls a series of scans performed on inventory, such as applications 110, based on information received from the collector 205. For example, the inventory controller 210 may perform network-based scans to identify vulnerable systems on wired or wireless networks. The example inventory controller 210 may perform host-based scans to locate and identify vulnerabilities in servers (e.g., the central server 120). The example inventory controller 210 may perform application scans to detect known software vulnerabilities and erroneous configurations in network applications, web applications, or local applications. In some examples, the inventory controller 210 performs one or more of scans to generate vulnerability information to store in the example inventory datastore 215.

In some examples, the inventory controller 210 obtains a master list of non-vulnerable applications and compares the list to the inventory information received from the collector 205. For example, collector 205 may collect file names from a file directory of the computing device, corresponding to one application from the registry. The file names may define the version in which the one application is currently operating on. The example inventory controller 210 compares the file names against the master list of file names to determine if the version of the application is the up-to-date version. In some examples, the master list of file names may be retrieved from a local database or from the network 115. The master list may be indicative of one or more files including up-to-date file names. In some examples, the inventory controller 210 determines if the list of file names, corresponding to the application, does not match with the master list of file names. If the list of file names do not match the master list, the application is tagged as vulnerable and stored in the example inventory datastore 215. If the list of file names does match the master list, the application is not tagged and stored as "updated," "protected," etc., in the example inventory datastore 215.

In other examples, the master list is indicative of vulnerable application file names. For example, the master list may be indicative of one or more file names that include security defects. In this example, the inventory controller 210 determines if a match occurs between the file names corresponding to the application and the file names of the master list. If a match does occur, the example inventory controller 210 tags the application as "vulnerable" and stores the application in the example inventory datastore 215. If a match does not occur, the example inventory controller 210 tags the application as "updated," "protected," etc., and stores the application in the example inventory datastore 215.

Additionally or alternatively, the master list obtained by the example inventory controller 210 may be indicative of non-malicious hosts, non-malicious networks, non-malicious databases, etc. In this manner, the master list may be compared against different types of information collected by the example collector 205 to identify vulnerabilities in the example computing environment 100. The example inventory controller 210 identifies vulnerabilities in the computing environment 100 in an effort to detect when a phishing attack may be successful, and further prevent the success of the attack.

In operation, the example inventory controller 210 receives an inventory list from the example collector 205. Further, the example inventory controller 210 initializes an inventory variable I to equal 1. The inventory variable I is indicative of one of the applications 110, such as the first application, program, or file in the inventory list. The example inventory controller 210 performs a vulnerability assessment on the inventory instance corresponding to I to identify security defects and/or other potential data defects that may allow exploitation of the application, and further, the computing environment 100. In some examples, if the inventory controller 210 determines I is vulnerable, the inventory controller 210 flags the inventory instance corresponding to I as a vulnerable instance and stores the instance in the example inventory datastore 215. Alternatively, if the example inventory controller 210 determines that I is not vulnerable, the example inventory controller 210 stores the inventory instance I in the inventory datastore 215 without the "vulnerable" tag or with a tag indicative that the application, program, file is not vulnerable.

In some examples, when the inventory controller 210 stores the inventory instance I in the inventory datastore 215, the inventory controller 210 determines if I is less than the number of inventory data in the inventory list provided by the example collector 205. For example, the inventory controller 210 can determine the number of inventory instances in the list provided by the example collector 205. Further, if the example inventory controller 210 determines I is less than the number of inventory instances in the inventory list, the example inventory controller 210 increments "I," and the next inventory instance undergoes vulnerability assessment. The example inventory controller 210 of FIG. 2 may implement a first means for identifying.

In FIG. 2, the example training network 130 includes the example inventory datastore 215 to store vulnerability information corresponding to the inventory lists for use by an example detection network 135. The example inventory datastore 215 may be implemented by any memory, storage device and/or storage disc for storing data such as, for example, flash memory, magnetic media, optical media, etc. Furthermore, the data stored in the inventory datastore 215 may be in any data format such as, for example, binary data, comma delimited data, tab delimited data, structured query language (SQL) structures, etc. While in the illustrated example the inventory datastore 215 is illustrated as a single database, the inventory datastore 215 may be implemented by any number and/or type(s) of databases. The inventory datastore 215 may provide information corresponding to computing environment 100 vulnerabilities. In some examples, the inventory datastore 215 is updated periodically by the inventory controller 210. For example, when changes occur in the computing environment 100, such as an update to ones of the applications 110, a new installation of an application, etc., the inventory controller 210 updates the information (e.g., vulnerability information) stored in the inventory datastore 215.

Figure 3:
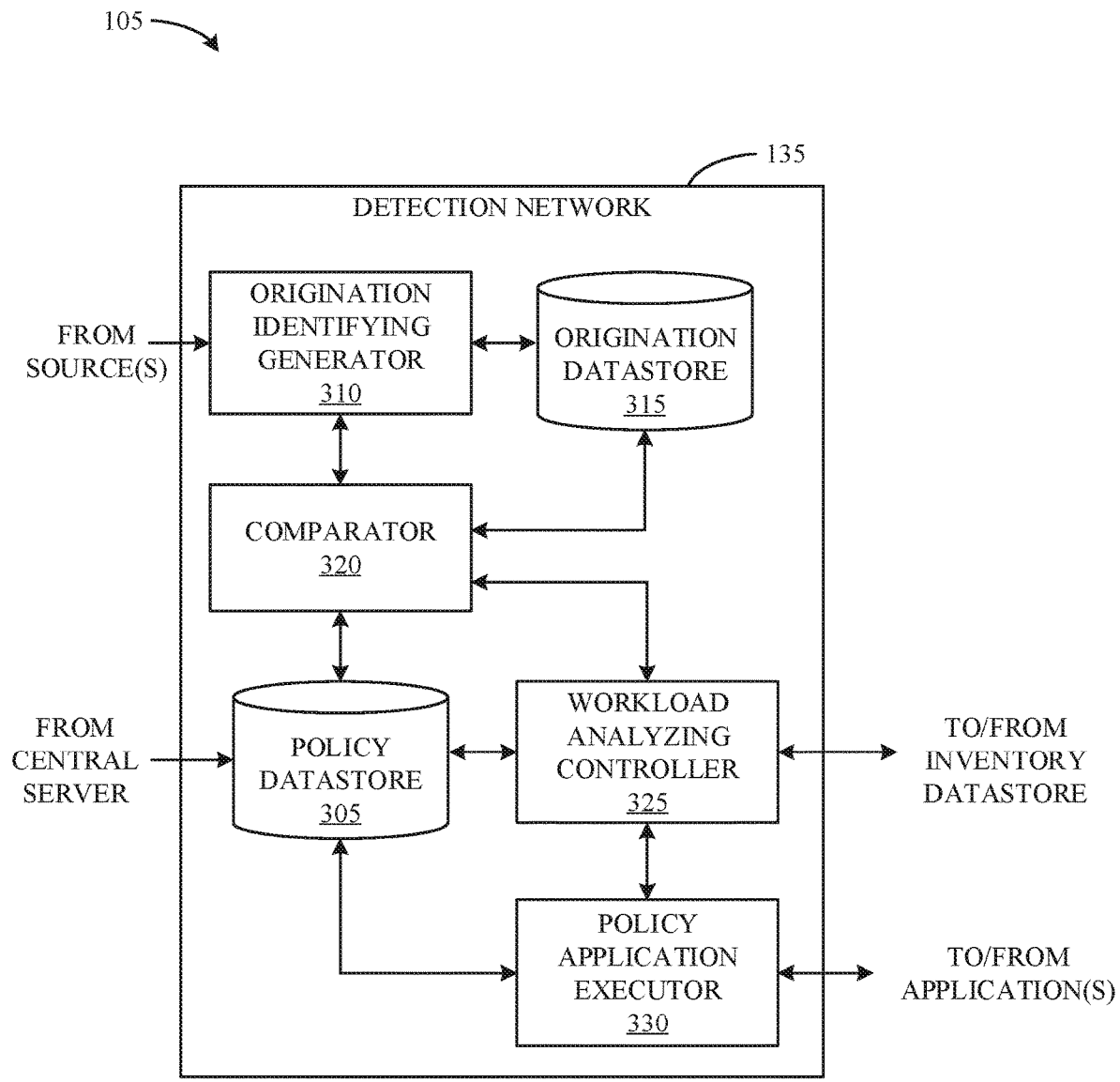
FIG. 3 is a block diagram illustration of an example detection network implemented by the example vulnerability system of FIG. 1 to enforce policy actions on the vulnerable applications.

FIG. 3 illustrates the example detection network 135 to detect a threat imposed on the computing environment 100 and apply a policy action to the ones of applications 110. The example detection network 135 may be implemented by the example vulnerability system 105 of FIG. 1. The example detection network 135 may include one or more interfaces to communicate with the example training network 130. The example detection network 135 includes an example policy datastore 305, an example origination identifying generator 310, an example origination datastore 315, an example comparator 320, an example workload analyzing controller 325, and an example policy application executor 330.

In FIG. 3, the example detection network 135 includes the example policy datastore 305 to store a plurality of policy actions received from the example central server 120 of FIG. 1. The example policy datastore 305 is coupled to the example comparator 320, the example workload analyzing controller 325, and the example policy application executor 330. The example policy datastore 305 is in communication with the example central server 120. A policy action is an instruction or rule, defined by an administrator, that is initiated when a violation in the computing environment 100 occurs. The example policy datastore 305 may be implemented by any memory, storage device and/or storage disc for storing data such as, for example, flash memory, magnetic media, optical media, etc. Furthermore, the data stored in the policy datastore 305 may be in any data format such as, for example, binary data, comma delimited data, tab delimited data, structured query language (SQL) structures, etc. While in the illustrated example the policy datastore 305 is illustrated as a single database, the policy datastore 305 may be implemented by any number and/or type(s) of databases.

In some examples, a policy action is a set of instructions or rules, defined by an administrator, that may be initiated when a violation in the example computing environment 100 occurs. Such policies include, but are not limited to, logging a violation, alerting the user to accept the risk of the user's actions, sandboxing a vulnerable process (e.g., isolating applications from critical system resources and other programs), containing the vulnerable process, and/or denying access to the downloaded data. Violations in the computing environment 100 are suspicious and/or malicious events that occur between the example sources 125 and the applications 110, between the example central server 120 and the applications 110, and/or the example network 115 and the example applications 110. In some examples, the violations are defined by the administrator and stored in the example policy datastore 305. In other examples, the violations are defined by the administrator and stored in the example origination datastore 315.

Example violation definitions may include a) vulnerable applications access documents/data that were not created by the user, b) vulnerable applications access documents/data that were not created on the local system (e.g., the central server 120), c) vulnerable applications access documents/data that were not created by users on the local network (e.g., the network 115), d) vulnerable applications access documents/data that were not delivered over the local network, and e) vulnerable applications access documents/data that were not delivered by trusted websites (e.g., sources 125). In some examples, the violation definitions correspond to particular policy actions. For example, the policy datastore 305 may map violations to policy actions, such as violation "a" corresponds to policy action "x."

In FIG. 3, the example detection network 135 includes the example origination identifying generator 310 to monitor the incoming data and determine an origination identifier for the incoming data. The example origination identifying generator 310 may be implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example origination identifying generator 310 is coupled to the example origination datastore 315 and the example comparator 320. In some examples, the origination identifying generator 310 monitors the network activity of the computing environment 100 to retrieve and analyze incoming data to identify the origination of the data. The example origination identifying generator 310 may retrieve and analyze incoming data before the data is accessed by the example applications 110.

For example, sources 125 may send data over the network 115 utilizing a network protocol, such as transmission control protocol (TCP), Internet protocol (IP), Ethernet, Hypertext Transfer protocol (HTTP), etc. The data may be structured as a packet by the source (e.g., the source 125) based on the type of protocol utilized. The structure of the data packet allows the source (e.g., the source 125) to send information to a destination (e.g., the application(s) 110). For example, the data packet includes a header and a payload, wherein the header stores overhead information about the packet, the service, and other transmission-related data (e.g., source address and destination address) and the payload is the information the source (e.g., the source 125) is providing to the destination (e.g., the application(s) 110). Therefore, the example origination identifying generator 310 may analyze headers of incoming data packets to determine the origination of the data. For example, the origination identifying generator 310 can analyze the header and determine if the source address is indicative of a suspicious source.

In an example operation, the origination identifying generator 310 determines a map of routes of the data from the destination back to the source. For example, the data may "hop" from the original source, through one or more intermediate devices (e.g., routers), before reaching the destination (e.g., the computing environment 100). Therefore, a mapping of the routes may assist the example origination identifying generator 310 to determine the original source of the incoming data. In some examples, the origination identifying generator 310 sends a traceroute to determine the path the data followed to get to the destination (e.g., computing environment 100). A traceroute is a utility (e.g., a small computer program) that records the route (e.g., the specific intermediate devices) of data through the network between the source and the destination. In some examples, the origination identifying generator 310 may not determine the origination source of the incoming data and tag the data as suspicious. For example, social engineers may be able to send an un-traceable data packet in an effort to avoid becoming identified.

In some examples, the origination identifying generator 310 generates an origination identifier for the incoming data. For example, the origination identifying generator 310 may generate a string of text identifying the origination source. In some examples, the string of text may be "local user," "local network user," "trusted website," "undefined user," "undefined network," "non-trusted website," etc. In some examples, the origination identifying generator 310 tags the data with the string of text. For example, the origination identifying generator 310 adds metadata to the incoming data and stores the tagged data in the example origination datastore 315. The example origination identifying generator 310 of FIG. 3 may include a second means for identifying.

In FIG. 3, the example detection network 135 includes the example origination datastore 315 to store data tagged with an origination identifier. The example origination datastore 315 may be implemented by any memory, storage device and/or storage disc for storing data such as, for example, flash memory, magnetic media, optical media, etc. Furthermore, the data stored in the origination datastore 315 may be in any data format such as, for example, binary data, comma delimited data, tab delimited data, structured query language (SQL) structures, etc. While in the illustrated example the origination datastore 315 is illustrated as a single database, the origination datastore 315 may be implemented by any number and/or type(s) of databases. The example origination datastore 315 is coupled to the example origination identifying generator 310 and the example comparator 320. The example origination datastore 315 stores data packets and waits for a query to provide the data packets to the example comparator 320.

In FIG. 3, the example detection network 135 includes the example comparator 320 to compare the data from the origination datastore 315 with violation information stored in the example policy datastore 305. The example comparator 320 may be implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example comparator 320 is coupled to the example origination identifying generator 310, the example origination datastore 315, the example policy datastore 305, and the example workload analyzing controller 325.

In some examples, the comparator 320 is initiated by the origination identifying generator 310 in response to receiving a notification from the origination identifying generator 310. In some examples, the comparator 320 queries the origination datastore 315 for the origination identifier corresponding to the notification. For example, the origination identifying generator 310 propagates, in addition to sending a notification, the incoming data to the comparator 320. Additionally, the example comparator 320 queries the policy datastore 305 to determine if the origination source is suspicious. For example, the origination identifier may not explicitly identify the origination source as suspicious. Therefore, the comparator 320 compares violation information stored in the example policy datastore 305 to the origination identifier.

The comparator 320 may be initiated when an application 110 attempts to access the data packet. For example, in operation, an email client of the computing device receives an email (e.g., incoming data), and the body (e.g., payload) of the email includes an attachment to be read by a word processor. In this example, the word processor may attempt to access the attachment. In this manner, the example comparator 320 is initialized, before the word processor reads the attachment. Further, the example comparator 320 retrieves the origination identifier from the example origination datastore 315 and compares the identifier to the violation information stored in the policy datastore 305. In some examples, if the comparator 320 determines there is a match between the violation information and the origination identifier, the comparator 320 flags the origination source as suspicious. In some examples, the comparator 320 initiates the example workload analyzing controller 325. The example comparator 320 of FIG. 3 may implement means for comparing.

In FIG. 3, the example detection network 135 includes the example workload analyzing controller 325 to determine a target application that is to access an incoming data. The example workload analyzing controller 325 may be implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example workload analyzing controller 325 is coupled to the example policy datastore 305, the example comparator 320, and the example policy application executor 330. Additionally, the example workload analyzing controller 325 may be in communication with the example inventory datastore 215 of FIG. 2 via any hardwired and/or wireless connection.

In some examples, the workload analyzing controller 325 is initialized by the example comparator 320 when an application (e.g., the application 110) attempts to access incoming data. In some examples, the workload analyzing controller waits for an attempted access of incoming data. The example workload analyzing controller 325 may determine the application that is to access the data. For example, the workload analyzing controller 325 may analyze a payload of the data. The payload of the data may be indicative of a function, algorithm, program, application, and/or other code combined into an executable file. In some examples, a function, algorithm, program, application, and/or other code may be represented as a graph including nodes, where the graph represents a workload and each node represents a particular task of that workload. Furthermore, the connections between the different nodes in the graph represent the data inputs and/or outputs needed to in order for a particular node to be executed and the vertices of the graph represent data dependencies between nodes of the graph.

The executable file includes a number of different executable sections, where each executable section is executable by a specific processing element (e.g., a CPU, a GPU, a VPU, and/or an FPGA). An application (e.g., 110) may correspond to one or more specific processing elements, such that the application (e.g., 110) may initiate a processing element in response to receiving the executable file. Additionally, an application (e.g., 110) may be able to provide the appropriate data inputs and/or outputs needed in order for a particular node to be executed. In this manner, the example workload analyzing controller 325 can analyze the nodes, processing elements, etc., of the workload to determine the target application that is to access the data packet and execute the executable file.

In response to determining the target application, the example workload analyzing controller 325 queries the example inventory datastore 215 for the target application.

For example, the workload analyzing controller 325 controls requests provided to the inventory datastore 215 for determining vulnerable and/or non-vulnerable applications that are to access the incoming data. For example, the workload analyzing controller 325 utilizes the target application information (e.g., the title, feature names, etc.) to control searches of the inventory datastore 215 that indicate a match. Additionally, the workload analyzing controller 325 analyzes the match to determine whether the target application is vulnerable.

In some examples, when the workload analyzing controller 325 determines the target application is vulnerable, the workload analyzing controller 325 initializes the example policy application executor 330. In other examples, when the workload analyzing controller 325 determines the target application is not vulnerable, the example workload analyzing controller 325 propagates the data to the target application. In some examples, the workload analyzing controller 325 notifies the target application that the data can be executed, read, etc. The example workload analyzing controller 325 of FIG. 3 may implement means for determining.

In FIG. 3, the example detection network 135 includes the example policy application executor 330 to apply a policy on a vulnerable application to protect the vulnerable application from exposing a security defect. The example policy application executor 330 may be implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), graphics processing units (GPUs), etc. The example policy application executor 330 is coupled to the example policy datastore 305 and the example workload analyzing controller 325. Additionally, the example policy application executor 330 is in communication with the example applications 110 via any hardwired and/or wireless connection.

In some examples, the policy application executor 330 retrieves policy actions from the policy datastore 305 in response to receiving a notification from the example workload analyzing controller 325. For example, the policy application executor 330 receives, from the workload analyzing controller 325, the vulnerable information corresponding to the target application as well as the origination identifier. Further, the example policy application executor 330 retrieves the policy action corresponding to the vulnerable information of the target application and the origination identifier. In some examples, the policy action is an executable file, stored in a memory of the example policy application executor 330. In some examples, the executable file includes a set of instructions and/or rules to be executed by the policy application executor 330. The example executable files stored in the example policy datastore 305 may be mapped to violation definitions. In this manner, the example policy application executor 330 can utilize the violation to initiate an executable file that corresponds to the appropriate policy action.

The appropriate policy action to be initiated is the policy action that protects the vulnerable application from being exploited (e.g., exposing the security defect). In some examples, a vulnerable application may include features that are not vulnerable and features that are vulnerable. For example, a word processor may include a graphing feature, a creating feature, an editing feature, and an inserting feature, where the inserting feature is flagged as vulnerable and the other features are not flagged as vulnerable. In this manner, the example policy application executor 330 applies a policy that removes access to the inserting feature but allows a user and/or the data in the data packet access to the other features. In this manner, the policy action limits the access to the word processor application but does not remove all access to the application.

In other examples, a vulnerable application may include features that are each flagged as vulnerable. For example, the inventory controller 210 of FIG. 2 determines that the all features in the word processor are outdated. In this manner, the example policy application executor 330 initiates a policy action that sandboxes the vulnerable application. For example, the policy action isolates the word processor from critical system resources and other programs to provide a layer of security that prevents malware or harmful data from negatively affecting the computing environment 100.

In some examples, the policy actions are initiated based on the origination identifier. For example, the policy application executor 330 initiates a first type of policy action when the origination identifier of the incoming data packet is indicative that the data packet was not delivered by a trusted website. The first type of policy action may be a restrictive and/or compute-intensive action taken on a vulnerable application. For example, the first type of policy action may include sandboxing the application, denying the application access to the data, and/or containing the vulnerable application. In other examples, the policy application executor 330 initiates a second type of policy action when the origination identifier of the incoming data packet is indicative that the data packet was not delivered from the current user. For example, the policy application executor 330 alerts the user interface to accept the risk of exploiting the computing environment 100. In this manner, the user decides if the application can access the data rather than the example policy application executor 330 determining access.

The second type of policy action may be a non-restrictive and/or less compute-intensive action taken on a vulnerable application. For example, second types of policy actions may include logging the violation in a memory and/or database of the example computing environment 100, alerting the user operating the computing device that an unknown user provided the data packet, requesting that the user operating the computing device accept the risk associated with accessing the data packet, etc.

The first type of policy action is taken when a known attack is threatening the computing environment 100. In some examples, the first type of policy action is referred to as an extreme policy action. For example, the origination identifying generator 310 determines the origination source is threatening if the origination source has previously attacked the computing environment 100. The second type of policy action is taken when an unknown or undefined origination source is sending data to the example computing environment 100. In some examples, the second type of policy action is referred to as a non-extreme policy action. For example, the origination identifying generator 310 may not define the origination source and/or may not have a previous history of a defined origination source. In this manner, the policy application executor 330 limits access to the applications or notifies the user that the data originates from a suspicious source. The example policy application executor 330 of FIG. 3 may implement means for applying.

While an example manner of implementing the vulnerability system 100 of FIG. 1 is illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example collector 205, the example inventory controller 210, the example origination identifying generator 310, the example comparator 320, the example workload analyzing controller 325, the example policy application executor 330, and/or, more generally, the example vulnerability system 100 of FIG. 1 may be implemented by hardware, software, firmware and/or any combination of hardware, software and/or firmware. Thus, for example, any of the example collector 205, the example inventory controller 210, the example origination identifying generator 310, the example comparator 320, the example workload analyzing controller 325, the example policy application executor 330, and/or, more generally, the example vulnerability system 105 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one oft the example collector 205, the example inventory controller 210, the example origination identifying generator 310, the example comparator 320, the example workload analyzing controller 325, and/or the example policy application executor 330, is/are hereby expressly defined to include a non-transitory computer readable storage device or storage disk such as a memory, a digital versatile disk (DVD), a compact disk (CD), a Blu-ray disk, etc. including the software and/or firmware. Further still, the example vulnerability system 100 of FIG. 1 may include one or more elements, processes and/or devices in addition to, or instead of, those illustrated in FIGS. 2 and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
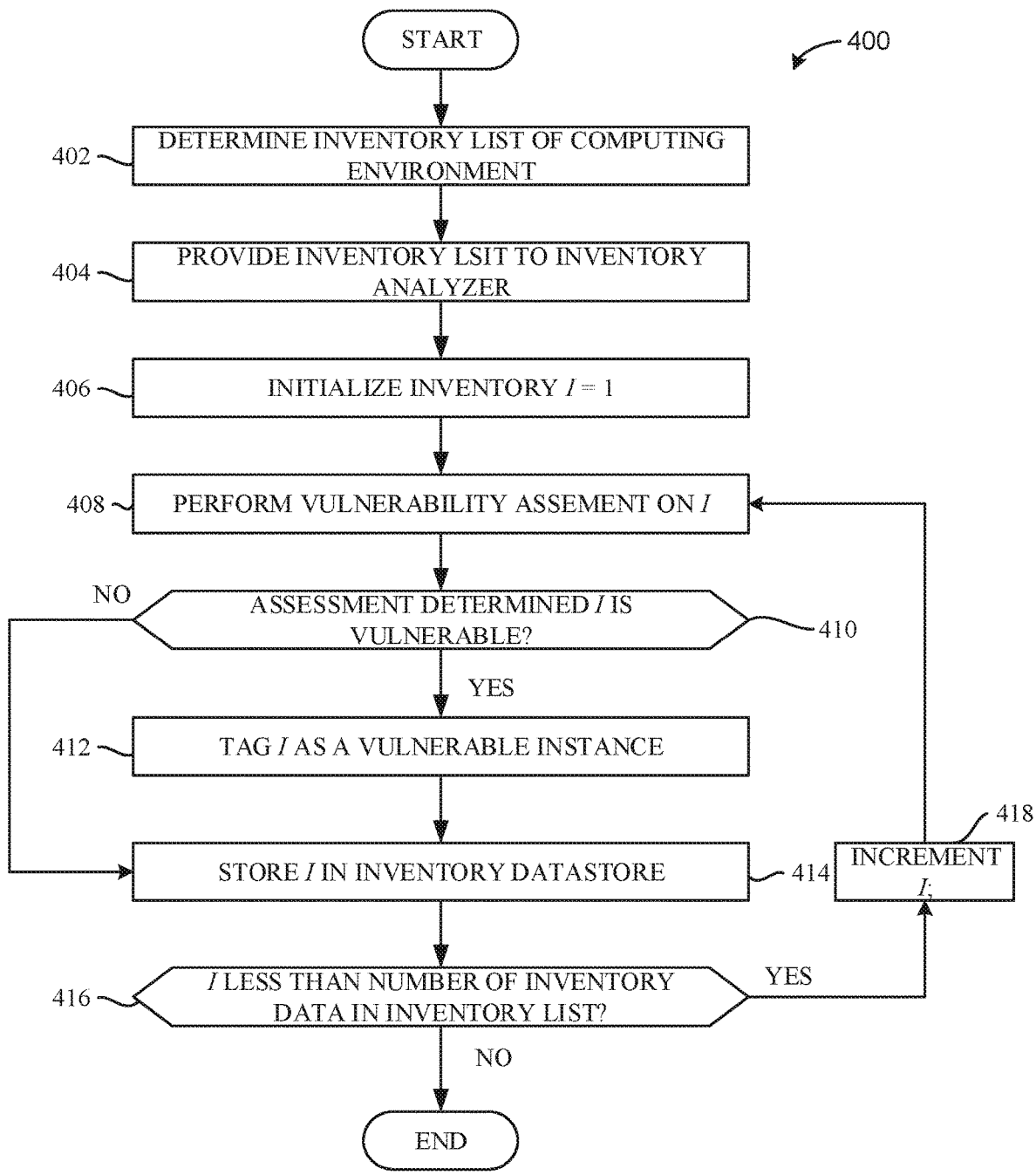
FIG. 4 is a flowchart representative of machine readable instructions which may be executed to implement the example training network of FIG. 2.

A flowchart representative of example hardware logic, machine readable instructions, hardware implemented state machines, and/or any combination thereof for implementing the example vulnerability system 105 of FIG. 1 is shown in FIGS. 4 and/or 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 4 and/or 5, many other methods of implementing the example vulnerability system 105 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 4 and 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The training program 400 of FIG. 4 begins at block 402, where the example collector 205 (FIG. 2) determines the inventory list of the computing environment 100. For example, the collector 205 generates a list of all the programs (e.g., word processors, gaming files, simulators, etc.) installed on the computing device of the computing environment 100 or deployed in the network 115 and utilized by the computing environment 100.

Further, the example collector 205 provides the inventory list to the example inventory controller 210 (FIG. 2) (block 404). For example, the collector 205 provides the list of programs to the inventory controller 210. The example inventory controller 210 receives the list of inventory data and initializes an inventory variable I to equal one (block 406). The inventory variable I may be indicative of the first application in the inventory list.

The example inventory controller 210 performs a vulnerability assessment on the inventory instance corresponding to I (block 408) to identify security defects and/or other potential data defects that may allow exploitation of the application, and further, the computing environment 100. For example, the inventory controller 210 may identify a version the application is operating at.

The example inventory controller 210 utilizes the vulnerability assessment to determine if I is vulnerable (block 410). For example, the inventory controller 210 determines that the application corresponding to I is operating at an outdated version (block 410 returns a value YES). In this manner, the example inventory controller 210 flags the application corresponding to I as a vulnerable instance (block 412). For example, the inventory controller 210 may indicate that a particular feature of the application is outdated and flag the particular feature as vulnerable. In other examples, the inventory controller 210 determines all features of the application are vulnerable and flags the application as vulnerable.

Further, the example inventory controller 210 stores the vulnerable instance I in the example inventory datastore 215 (block 414). For example, the inventory controller 210 stores the application information (e.g., title, feature name, etc.) in the inventory datastore 215 with the vulnerability tag.

Alternatively, if the example inventory controller 210 determines that I is not vulnerable (e.g., block 410 returns a value NO), the example inventory controller 210 stores the application corresponding to I in the inventory datastore 215 (block 414) without the vulnerable tag.

The example inventory controller 210 determines if I is less than the number of inventory data in the inventory list (block 416) provided by the example collector 205. For example, the inventory controller 210 can determine the number of inventory instances in the list provided by the example collector 205. Further, if the example inventory controller 210 determines I is less than the number of inventory instances in the inventory list (e.g., block 416 returns a value YES), the example inventory controller 210 increments I, (block 418) and the next inventory instance undergoes vulnerability assessment (block 408).

If the example inventory controller 210 determines I is greater than or equal to the number of inventory instances in the inventory list (e.g., block 416 returns a value NO), the training program 400 of FIG. 4 ends. The training program 400 may be repeated when inventory is collected by the example collector 205 and an updated and/or a new list is provided to the example inventory controller 210.

Figure 5:
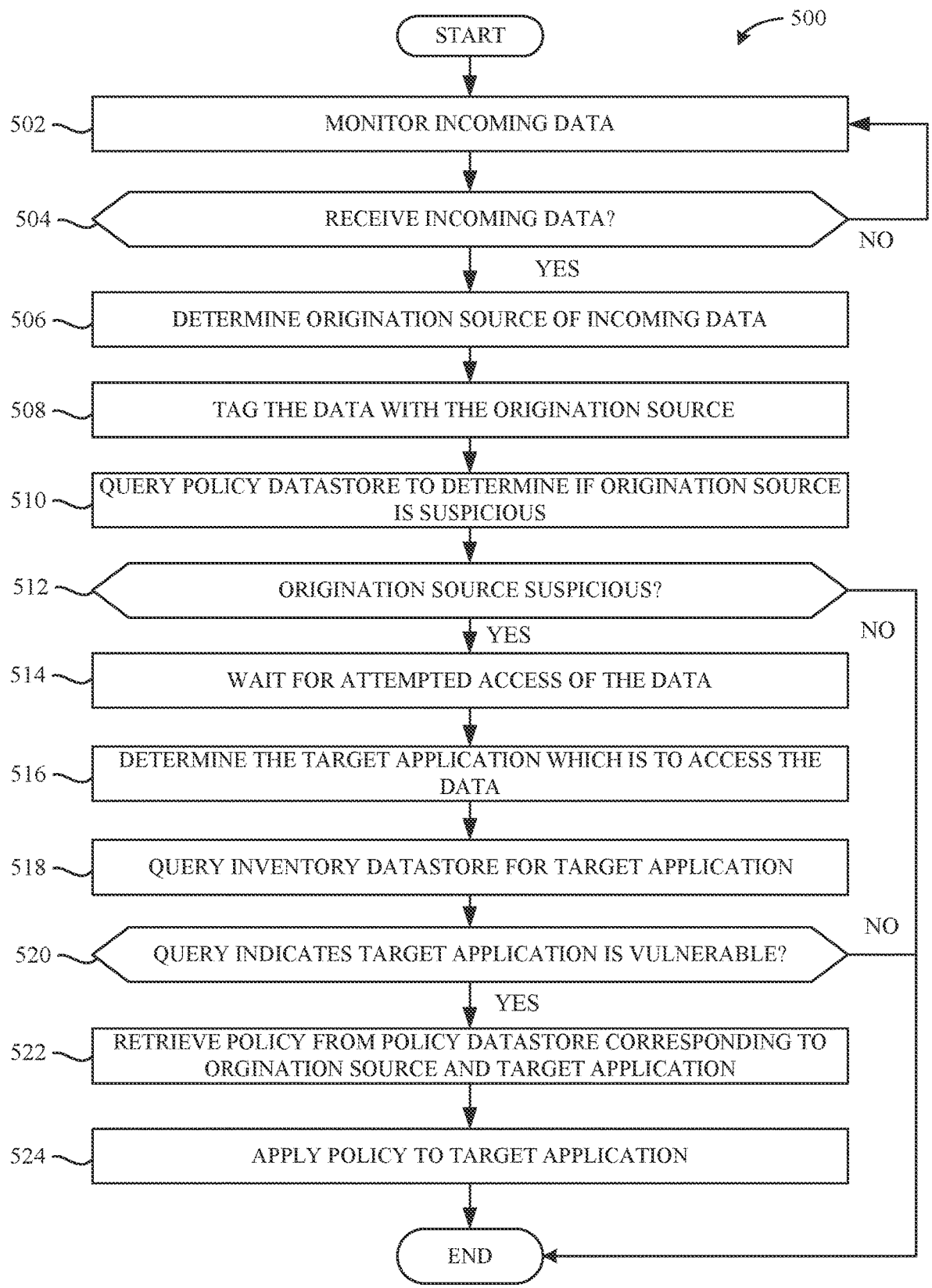
FIG. 5 is a flowchart representative of machine readable instructions which may be executed to implement the example detection network of FIG. 3.

The detection program 500 of FIG. 5 begins at block 502, where the example origination identifying generator 310 (FIG. 3) monitors incoming data. For example, the origination identifying generator 310 monitors the network activity of the computing environment 100 to retrieve and analyze incoming data. The example origination identifying generator 310 waits to receive incoming data (block 504). For example, the origination identifying generator 310 reads incoming data (e.g., block 504 returns a value YES).

The example origination identifying generator 310 determines the origination source of the incoming data (block 506). For example, the origination identifying generator 310 may analyze headers of incoming data to determine the origination of the data. In some examples, the origination identifying generator 310 determines if the origination source is suspicious and/or malicious. The example origination identifying generator 310 tags the data with the origination source (block 508). For example, the origination identifying generator 310 generates an origination identifier and adds the identifier to the data as the data's metadata. In some examples, the origination identifying generator 310 stores the tagged data in the origination datastore 315.

The example comparator 320 queries the policy datastore 305 to determine if the origination source is suspicious (block 510). For example, the comparator 320 receives incoming data from the origination identifying generator 310 and queries the origination datastore 315 for the origination identifier corresponding to the incoming data. Further, the example comparator 320 compares violation information stored in the example policy datastore 305 to the origination identifier.

The example comparator 320 determines if the origination source is suspicious (block 512). For example, if the comparator 320 determines there is not a match between the origination identifier and the violation information, then the comparator 320 determines the origination source is not suspicious (e.g., block 512 returns a value NO) and the detection program 500 ends.

In other examples, if the comparator 320 determines there is a match between the origination identifier and the violation information, then the comparator 320 determines the origination source is suspicious (e.g., block 512 returns a value YES). The example comparator 320 waits for attempted access of the data (block 514). For example, the comparator 320 may be notified that an application 110 is attempting to access the data packet in an effort to determine policy actions.

When the example comparator 320 is notified that there is an attempted access of the data, the example comparator 320 initializes the workload analyzing controller 325 when an application (e.g., the application 110) attempts to access an incoming data packet. The example workload analyzing controller 325 determines the target application that is to access the data (block 516). For example, the workload analyzing controller 325 may analyze the payload of the data packet to determine the target application that is to access the data packet. In response to determining the target application, the example workload analyzing controller 325 queries the example inventory datastore 215 for the target application (block 518). For example, the workload analyzing controller 325 queries the inventory datastore 215 to determine if the incoming data is to be accessed by a vulnerable application.

In some examples, the workload analyzing controller 325 determines the target application is not vulnerable (e.g., block 520 returns a value NO), and the detection program 500 ends. For example, if the target application is not vulnerable, the example vulnerability system 105 does not apply policy actions because the target application is up-to-date and can defend against potentially malicious attacks.

In some examples, when the workload analyzing controller 325 determines the target application is vulnerable (e.g., block 520 returns a value NO), the workload analyzing controller 325 initializes the example policy application executor 330. For example, the policy application executor 330 receives the vulnerable information corresponding to the target application as well as the origination identifier. Furthermore, the example policy application executor 330 retrieves the policy action from the policy datastore 305 corresponding to the vulnerable information of the target application and the origination identifier (block 522). For example, the policy action may be mapped to violation definitions, vulnerable applications and/or vulnerable features, suspicious origination sources, etc. In this manner, the policy application executor 330 can retrieve the appropriate policy action.

Additionally, the example policy application executor 330 applies the policy to the target application (block 524). For example, the policy application executor 330 applies a policy that removes access to the vulnerable features of the target application. In other examples, the policy application executor 330 applies a policy action that sandboxes the target application. In some examples, the policy application executor 330 applies a policy action that alerts the user interface to accept the risk of exploiting the computing environment 100 and/or target application.

The example detection program 500 of FIG. 5 ends when the policy action has been applied to the target application (block 524). The example detection program 500 of FIG. 5 may be repeated when the example origination identifying generator 310 receives an incoming data packet.

Figure 6:
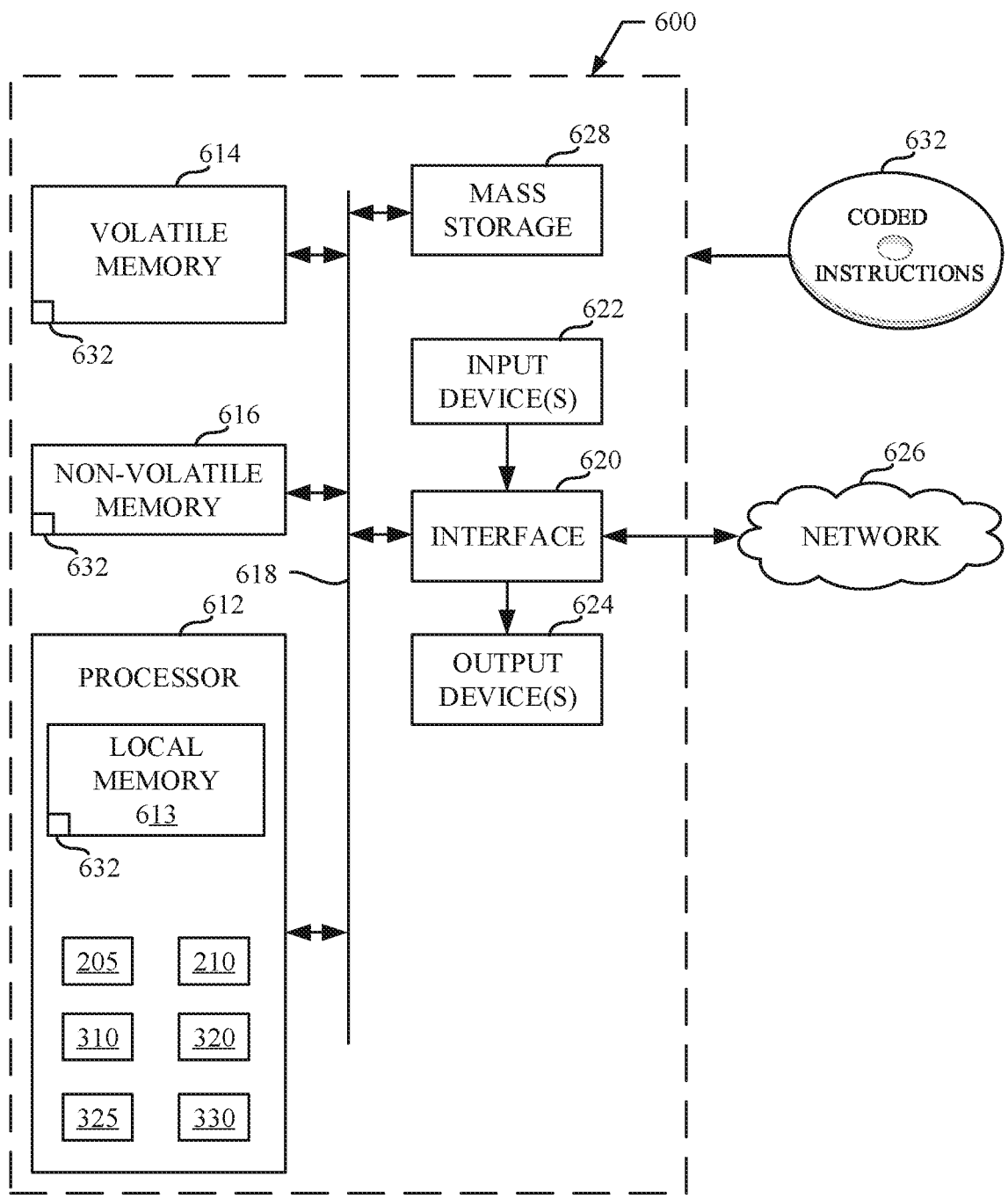
FIG. 6 is a block diagram of an example processing platform structured to execute the instructions of FIGS. 4 and/or 5 to implement the example vulnerability system of FIGS. 1, 2, and/or 3.

FIG. 6 is a block diagram of an example processor platform 600 structured to execute the instructions of FIGS. 4 and 5 to implement the apparatus of FIGS. 1, 2, and 3. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example collector 205, the example inventory controller 210, the example origination identifying generator 310, the example comparator 320, the example workload analyzing controller 325, and the example policy application executor 330.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), and/or a tactile output device. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4 and 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that improve user productivity of utilizing computing devices by limiting user access to applications that are vulnerable and that are to access data from a suspicious source. The disclosed methods, apparatus and articles of manufacture improve the efficiency of using a computing device by applying non compute-intensive policy actions to vulnerable applications to improve productivity and computational efficiency of the computing device in which the applications are operating on while providing the computing device protection from potentially malicious data. The disclosed methods, apparatus and articles of manufacture are accordingly directed to one or more improvement(s) in the functioning of a computer.

Example methods, apparatus, systems, and articles of manufacture to defend against exploitation of vulnerable software are disclosed herein. Further examples and combinations thereof include the following: An apparatus comprising an inventory controller to identify a vulnerable application corresponding to one or more files including a security defect, an origination identifying generator to identify an origination source of incoming data, the origination source tagged as suspicious, a workload analyzing controller to query, in response to the suspicious origination source, an inventory datastore to determine if the incoming data is to be accessed by the vulnerable application, and a policy application executor to, in response to determining the incoming data is to be accessed by the vulnerable application, apply a policy action to the vulnerable application to protect the vulnerable application from exposing the security defect to malicious data in the incoming data.

Example 2 includes the apparatus of example 1, wherein the inventory controller is to perform a vulnerability assessment on the vulnerable application to determine one or more files with the security defect.

Example 3 includes the apparatus of example 1, further including a comparator to compare the origination source to one or more violation definitions to determine if the origination source is suspicious.

Example 4 includes the apparatus of example 1, wherein the workload analyzing controller is to wait for an attempted access of the incoming data before determining if the incoming data is to be accessed by the vulnerable application.

Example 5 includes the apparatus of example 1, wherein the policy application executor is to retrieve the policy action from a policy datastore, the policy action corresponding to the origination source and the vulnerable application.

Example 6 includes the apparatus of example 1, wherein the policy application executor is to apply the policy action to the one or more files including the security defect.

Example 7 includes the apparatus of example 6, wherein the policy application executor is to remove access to the one or more files including the security defect and allow access to one or more non-vulnerable files of the vulnerable application.

Example 8 includes a non-transitory computer readable storage medium comprising computer readable instructions that, when executed, cause at least one processor to at least identify a vulnerable application corresponding to one or more files including a security defect, identify an origination source of incoming data, the origination source tagged as suspicious, query, in response to the suspicious origination source, an inventory datastore to determine if the incoming data is to be accessed by the vulnerable application, and apply, in response to determining the incoming data is to be accessed by the vulnerable application, a policy action to the vulnerable application to protect the vulnerable application from exposing the security defect to malicious data in the incoming data.

Example 9 includes the non-transitory computer readable storage medium of example 8, wherein the computer readable instructions, when executed, cause the at least one processor to perform a vulnerability assessment on the vulnerable application to determine the one or more files with the security defect.

Example 10 includes the non-transitory computer readable storage medium of example 8, wherein the computer readable instructions, when executed, cause the at least one processor to compare the origination source to one or more violation definitions to determine if the origination source is suspicious.

Example 11 includes the non-transitory computer readable storage medium of example 8, wherein the computer readable instructions, when executed, cause the at least one processor to wait for an attempted access of the incoming data before determining if the incoming data is to be accessed by the vulnerable application.

Example 12 includes the non-transitory computer readable storage medium of example 8, wherein the computer readable instructions, when executed, cause the at least one processor to retrieve the policy action from a policy datastore, the policy action corresponding to the origination source and the vulnerable application.

Example 13 includes the non-transitory computer readable storage medium of example 8, wherein the computer readable instructions, when executed, cause the at least one processor to apply the policy action to the one or more files including the security defect.

Example 14 includes the non-transitory computer readable storage medium of example 13, wherein the computer readable instructions, when executed, cause the at least one processor to remove access to the one or more files including the security defect and allows access to one or more non-vulnerable files of the vulnerable application.

Example 15 includes a method comprising identifying a vulnerable application corresponding to one or more files including a security defect, identifying an origination source of incoming data, the origination source tagged as suspicious, querying, in response to the suspicious origination source, an inventory datastore to determine if the incoming data is to be accessed by the vulnerable application, and applying, in response to determining the incoming data is to be accessed by the vulnerable application, a policy action to the vulnerable application to protect the vulnerable application from exposing the security defect to malicious data in the incoming data.

Example 16 includes the method of example 15, further including performing a vulnerability assessment on the vulnerable application to determine the one or more files with the security defect.

Example 17 includes the method of example 15, further including comparing the origination source to one or more violation definitions to determine if the origination source is suspicious.

Example 18 includes the method of example 15, wherein the determining if the incoming data is to be accessed by the vulnerable application includes waiting for an attempted access of the incoming data.

Example 19 includes the method of example 15, further including retrieving the policy action from a policy datastore, the policy action corresponding to the origination source and the vulnerable application.

Example 20 includes the method of example 15, further including applying the policy action to the one or more files including the security defect.

Example 21 includes the method of example 20, wherein applying the policy action to the vulnerable application removes access to the one or more files and allows access to one or more non-vulnerable files of the vulnerable application.

Example 22 includes an apparatus for defending vulnerable applications, the apparatus comprising a first means for identifying, the first means for identifying to identify a vulnerable application corresponding to one or more files including a security defect, a second means for identifying, the second means for identifying to identify an origination source of incoming data, the origination source tagged as suspicious, means for determining, the means for determining to determine if the incoming data is to be accessed by the vulnerable application by querying an inventory datastore in response to the suspicious origination source, and means for applying, the means for applying to apply a policy action to the vulnerable application, in response to determining the incoming data is to be accessed by the vulnerable application, to protect the vulnerable application from exposing the security defect to malicious data in the incoming data.

Example 23 includes the apparatus of example 22, wherein the first means for identifying is to perform a vulnerability assessment on the vulnerable application to determine one or more files with the security defect.

Example 24 includes the apparatus of example 22, further including means for comparing, the means for comparing to compare the origination source to one or more violation definitions to determine if the origination source is suspicious.

Example 24 includes the apparatus of example 22, wherein the means for determining is to wait for an attempted access of the incoming data before determining if the incoming data is to be accessed by the vulnerable application.

Example 25 includes the apparatus of example 22, where in the means for applying is to retrieve the policy action from a policy datastore, the policy action corresponding to the origination source and the vulnerable application.

Example 26 includes the apparatus of example 22, wherein the means for applying is to apply the policy action to the one or more files including the security defect.

Example 27 includes the apparatus of example 26, wherein the means for applying is to remove access to the one or more files including the security defect and allow access to one or more non-vulnerable files of the vulnerable application.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
    an inventory controller to identify a vulnerable application corresponding to one or more files including a security defect;
    an origination identifying generator to identify an origination source of incoming data, the origination source tagged as suspicious;
    a workload analyzing controller to query, in response to the suspicious origination source, an inventory datastore to determine if the incoming data is to be accessed by the vulnerable application; and
    a policy application executor to, in response to determining the incoming data is to be accessed by the vulnerable application;
        apply a policy action to the vulnerable application to protect the vulnerable application from exposing the security defect to malicious data in the incoming data; and
        remove, based on the policy action, user-access to portions of the vulnerable application that include the security defect and allow user-access to portions of the vulnerable application that do not include the security defect.

2. The apparatus of claim 1, wherein the inventory controller is to perform a vulnerability assessment on the vulnerable application to determine one or more files with the security defect.

3. The apparatus of claim 1, further including a comparator to compare the origination source to one or more violation definitions to determine if the origination source is suspicious.

4. The apparatus of claim 1, wherein the workload analyzing controller is to wait for an attempted access of the incoming data before determining if the incoming data is to be accessed by the vulnerable application.

5. The apparatus of claim 1, wherein the policy application executor is to retrieve the policy action from a policy datastore, the policy action corresponding to the origination source and the vulnerable application.

6. The apparatus of claim 1, wherein the policy application executor is to apply the policy action to the one or more files including the security defect.

7. The apparatus of claim 6, wherein the policy application executor is to remove access to the one or more files including the security defect and allow access to one or more non-vulnerable files of the vulnerable application.

8. A non-transitory computer readable storage medium comprising computer readable instructions that, when executed, cause at least one processor to at least:
    identify a vulnerable application corresponding to one or more files including a security defect;
    identify an origination source of incoming data, the origination source tagged as suspicious;
    query, in response to the suspicious origination source, an inventory datastore to determine if the incoming data is to be accessed by the vulnerable application;
    apply, in response to determining the incoming data is to be accessed by the vulnerable application, a policy action to the vulnerable application to protect the vulnerable application from exposing the security defect to malicious data in the incoming data; and
    remove, based on the policy action, user-access to portions of the vulnerable application that include the security defect and allow user-access to portions of the vulnerable application that do not include the security defect.

9. The non-transitory computer readable storage medium of claim 8, wherein the computer readable instructions, when executed, cause the at least one processor to perform a vulnerability assessment on the vulnerable application to determine the one or more files with the security defect.

10. The non-transitory computer readable storage medium of claim 8, wherein the computer readable instructions, when executed, cause the at least one processor to compare the origination source to one or more violation definitions to determine if the origination source is suspicious.

11. The non-transitory computer readable storage medium of claim 8, wherein the computer readable instructions, when executed, cause the at least one processor to wait for an attempted access of the incoming data before determining if the incoming data is to be accessed by the vulnerable application.

12. The non-transitory computer readable storage medium of claim 8, wherein the computer readable instructions, when executed, cause the at least one processor to retrieve the policy action from a policy datastore, the policy action corresponding to the origination source and the vulnerable application.

13. The non-transitory computer readable storage medium of claim 8, wherein the computer readable instructions, when executed, cause the at least one processor to apply the policy action to the one or more files including the security defect.

14. The non-transitory computer readable storage medium of claim 13, wherein the computer readable instructions, when executed, cause the at least one processor to remove access to the one or more files including the security defect and allows access to one or more non-vulnerable files of the vulnerable application.

15. A method comprising:
    identifying a vulnerable application corresponding to one or more files including a security defect;

identifying an origination source of incoming data, the origination source tagged as suspicious;

querying, in response to the suspicious origination source, an inventory datastore to determine if the incoming data is to be accessed by the vulnerable application;

applying, in response to determining the incoming data is to be accessed by the vulnerable application, a policy action to the vulnerable application to protect the vulnerable application from exposing the security defect to malicious data in the incoming data; and removing, based on the policy action, user-access to portions of the vulnerable application that include the security defect and allow user-access to portions of the vulnerable application that do not include the security defect.

16. The method of claim 15, further including performing a vulnerability assessment on the vulnerable application to determine the one or more files with the security defect.

17. The method of claim 15, further including comparing the origination source to one or more violation definitions to determine if the origination source is suspicious.

18. The method of claim 15, wherein the determining if the incoming data is to be accessed by the vulnerable application includes waiting for an attempted access of the incoming data.

19. The method of claim 15, further including retrieving the policy action from a policy datastore, the policy action corresponding to the origination source and the vulnerable application.

20. The method of claim 15, further including applying the policy action to the one or more files including the security defect.

* * * * *